United States Patent
Aubert et al.

[11] 3,962,532
[45] June 8, 1976

[54] POWER SUPPLY FOR AN AUDIO-VIDEO RECORDING SYSTEM

[75] Inventors: Richard C. Aubert; George R. Dean, both of Chicago; James B. Ricks, Evanston; John W. Wade, Mount Prospect, all of Ill.

[73] Assignee: Bell & Howell Company, Chicago, Ill.

[22] Filed: Apr. 18, 1975

[21] Appl. No.: 569,346

[52] U.S. Cl. ............ 178/5.6; 178/DIG. 9; 360/69; 325/492; 178/DIG. 11
[51] Int. Cl.² ............................... H04N 7/00
[58] Field of Search .......... 325/396, 492, 494, 311, 325/496; 178/DIG. 9, DIG. 11, 5.6, 5.8; 360/69; 358/4

[56] References Cited
UNITED STATES PATENTS

| | | | |
|---|---|---|---|
| 3,611,151 | 10/1971 | Fernandez | 325/396 |
| 3,818,352 | 6/1974 | Moran | 325/396 |
| 3,873,921 | 3/1975 | Petrinec | 325/396 |

*Primary Examiner*—Robert L. Griffin
*Assistant Examiner*—Aristotelis M. Psitos
*Attorney, Agent, or Firm*—Richard Gray; Roger M. Fitz-Gerald

[57] ABSTRACT

The disclosure relates to a selectively operable power supply for a recording system of the type which includes tuning and intermediate frequency sections for receiving and converting transmitted television signals into composite video and audio signals and a recorder for recording the composite video and audio television signals onto a recording medium. The power supply comprises a timer including a switch which is selectively operable for providing an A.C. line voltage when its contacts are closed at preselected times and a receptacle coupled to the switch and adapted to receive the power input of the recorder for powering the recorder at the preselected times and a rectifier and filter coupled to the switch for powering the tuning and intermediate frequency sections with filtered DC voltage at the preselected times.

9 Claims, 2 Drawing Figures

POWER SUPPLY FOR AN AUDIO-VIDEO RECORDING SYSTEM

BACKGROUND OF THE INVENTION

Recording systems of the type which record composite video and audio television signals onto a recording medium are well-known in the art. Such systems generally include tuning and intermediate frequency sections for receiving and converting transmitted television signals into composite audio and video signals and a recorder for recording the composite video and audio television signals.

Such recording systems find considerable use in educational environments. With educational television becoming increasingly popular, schools and other educational facilities are utilizing recording devices of this type for recording educational programs. Unfortunately, educational television programs are not always broadcasted at suitable times for allowing an instructor to show his or her class a desirable program as it is actually being broadcasted. Recording systems therefore are particularly adapted for use in this environment wherein the instructor may prerecord the educational program for later viewing by the class.

Oftentimes an educational program is broadcasted at a time which is inconvenient for an instructor to manually record the program. In circumstances of this nature it would be desirable to have a recording system which will automatically record the desired program without necessitating manual operation.

It is therefore a general object of the present invention to provide a new and improved recording system of the type which records composite audio and video television signals onto a recording medium automatically at preselected times.

It is a more particular object of the present invention to provide a power supply for such a recording system which actuates the recording system at preselected times to facilitate automatic recording of composite video and audio television signals.

It is a still further object of the present invention to provide a selectively operable power supply for a recording system which is adaptable for use with any recorder device requiring AC line voltage for operation.

SUMMARY OF THE INVENTION

The present invention provides in a recording system of the type which records composite video and audio television signals onto a recording medium which includes a tuning and intermediate frequency section for receiving and converting transmitted television signals into composite video and audio signals and a recording device for recording the composite video and audio signals and having an input adapted for connection to an AC power source, the improvement of a power supply for activating the tuning and intermediate frequency sections and the recording device to enable recording of the composite video and audio signals at preselected times. The power supply of the present invention comprises a timer having an input adapted for connection to an AC line voltage source, a switch coupled to the input and selectively operable for closing at a preselected time for providing the AC line voltage, and a receptacle coupled to the switch and adapted for receiving the recording device input for supplying the recording device with activating AC line voltage when the switch is closed, rectifying means also coupled to the switch for converting the AC line voltage to a pulsating DC voltage and filtering means coupled to the rectifying means and to the tuning and intermediate frequency sections for providing the tuning and intermediate frequency sections with activating filtered DC voltage when the switch is closed. As a result, when the switch is closed at the preselected times, the tuning and intermediate frequency sections are activated by the filtered DC voltage derived by the rectifying means and the filtering means from the AC line voltage provided by the timer switch to thereby produce the composite video and audio signals, and the recording device is activated for recording the composite video and audio signals by the AC line voltage provided by the timer switch at the receptacle.

BRIEF DESCRIPTION OF THE DRAWINGS

The invention, together with the objects and advantages thereof, may best be understood by reference to the following description taken in conjunction with the accompanying drawings, and in the several figures of which like reference numerals identify like elements, and in which.

DESCRIPTION OF THE PREFERRED EMBODIMENT

Figure 1:
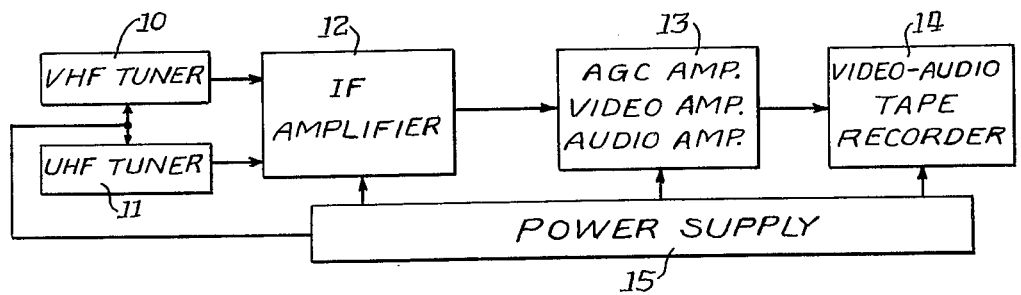
FIG. 1 is a block diagram of a recording system embodying the present invention.

Referring now to FIG. 1, the block diagram of the recording system embodying the present invention thereshown comprises VHF tuner 10, UHF tuner 11, intermediate frequency amplifier 12, automatic gain control, video and audio amplifier 13, video-audio tape recorder 14 and power supply 15.

VHF tuner 10 and UHF tuner 11 are coupled to the intermediate frequency amplifier 12 wherein the transmitted television signals received by the VHF tuner and UHF tuner are converted into composite video and audio television signals. IF amplifier 12 is coupled to the AGC, video and audio amplifier 13 which amplifies the composite video and audio signals to suitable levels for either being viewed on a television screen (not shown) or recorded by the video-audio tape recorder 14. The power supply 15 is coupled to the VHF tuner 10, UHF tuner 11, IF amplifier 12, AGC, video and audio amplifier 13 and the video-audio tape recorder 14. Power supply 15 supplies the system with activating power to cause the tuners 10, 11, intermediate frequency amplifier 12 and AGC, video and audio amplifier 13 to receive the transmitted television signals and convert them to composite video and audio television signals having suitable levels for being viewed or recorded. Power supply 15 also provides actuating power to the video-audio tape recorder 14 to enable recording of the composite video and audio signals.

Figure 2:
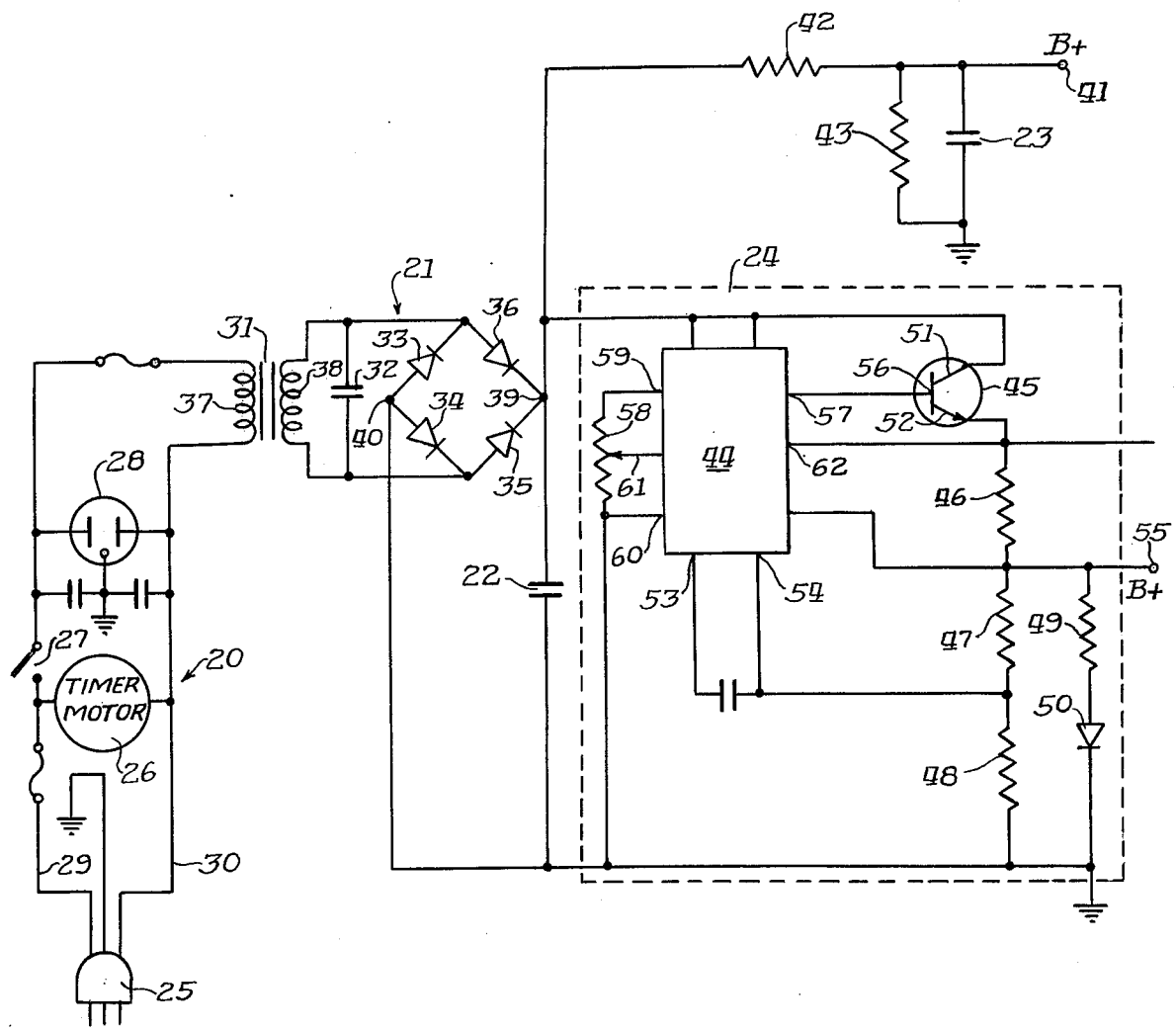
FIG. 2 is a detailed circuit diagram of a power supply which may be utilized in the system of FIG. 1 and which embodies the present invention.

A detailed schematic circuit diagram of the power supply 15 of FIG. 1 is shown in FIG. 2. It comprises a timer generally designated at 20, a rectifier generally designated at 21, filter capacitors 22 and 23, and a series DC voltage regulator 24.

Timer 20 comprises an input plug 25 adapted for connection to an AC line voltage source, timer motor 26, switch 27, and an AC receptacle 28. Timer motor 26 is coupled across lines 29 and 30 of input plug 25 and keeps time under the power of the AC line voltage on lines 29 and 30 received at input plug 25. Switch 27 is coupled to timer motor 26 in a manner well-known in the art and to one side of input plug 25 for providing the AC line voltage when it closes. Timer motor 26 is preferably a 12 or 24 hour clock having a digital readout so that the time of day may be read therefrom. Also associated with the timer motor and switch 27 is a means for setting the timer for closing switch 27 at a preselected time also in a manner well-known in the art.

Receptacle 28 is coupled across the input plug 25 on lines 29 and 30 for receiving the AC line voltage when switch 27 closes. Receptacle 28 is of the type adapted for receiving the AC input power plug of the video-audio tape recorder 14. Thus, when switch 27 closes, the video-audio tape recorder will be powered by the AC line voltage provided at receptacle 28 for recording the composite video and audio television signals.

Rectifier 21 comprises transformer 31, capacitor 32 and diodes 33–36 which are coupled together in a diode bridge configuration. Transformer 31 has primary winding 37 coupled across lines 29 and 30 to receive the AC line voltage when switch 27 closes. The secondary 38 of transformer 31 is coupled across the diode bridge comprising diodes 33–36 in the conventional manner so that a pulsating DC voltage is induced at junction 39 of diodes 35 and 36 with reference to a ground potential at junction 40.

The pulsating DC voltage is filtered by filter capacitor 22 which is coupled between junction 39 and ground. Junction 39 is also coupled to a first output terminal 41 by a filter network comprising resistors 42 and 43 and capacitor 23. Therefore, a filtered DC power voltage is provided at terminal 41 which may be utilized for powering IF amplifier 12, and the AGC, video and audio amplifier 13 of FIG. 1.

The pulsating DC voltage at junction 39 is also coupled to a series regulator circuit 24 which provides filtered regulated DC supply voltage for the tuners 10, 11 at a second terminal 55. Series regulator circuit 24 comprises integrated circuit 44, transistor 45, resistors 46-49, variable resistor 58 and light emitting diode 50. Integrated circuit 44 is preferably an SN723N type commercially available from Texas Instruments, Inc. of Dallas, Texas. The voltage regulator 24 of FIG. 2 is of a type well-known in the art and is fully described in *The Linear and Interface Circuits Data Book for Design Engineers* published by Texas Instruments, Inc., first edition, 1973, at page 5–19.

Transistor 45 has a collector 51 coupled to junction 39 for receiving the unregulated filtered DC voltage. Emitter 52 of transistor 45 is coupled to ground through a series of resistors 46, 47 and 48. Integrated circuit 44 has inputs 53 and 54 coupled to the junction of resistors 47 and 48 and receives therefrom a portion of the output voltage developed at output terminal 55. Integrated circuit 44 includes a differential amplifier circuit which compares the portion of the output voltage to an internally generated reference voltage and provides a suitable control biasing voltage to base 56 of transistor 45 from its output 57 to cause transistor 45 to conduct just enough current to maintain the desired regulated voltage at output terminal 55.

Variable resistor 58 is coupled across inputs 59 and 60 of integrated circuit 44 to ground as shown and includes wiper 61 which is utilized for adjusting the reference voltage to which the integrated circuit 44 compares the partial output voltage at the junction of resistors 47 and 48 to thereby provide variable adjustment of the regulated voltage. Integrated circuit 44 also has input 62 coupled to emitter 52 of transistor 45 to thereby sense the regulator output current. Should the output current exceed a predetermined limit, base 56 will be biased to interrupt the regulated DC voltage at terminal 55. This provides component protection for over current conditions.

Light emitting diode 50 coupled between output 55 and ground by resistor 49 lights up when the regulator is supplying regulated DC voltage. It therefore serves as an indicator for indicating when the regulated DC voltage power is being provided. The regulated DC voltage provided at terminal 55 is suitable for powering the VHF tuner 10 and UHF tuner 11 of FIG. 1.

In operation, assuming that a television program to be recorded is to be transmitted at a preselected time, the timer 20 is set so that switch 27 will close when timer motor 26 reaches the preselected time. When the preselected time is reached, switch 27 closes providing the AC line voltage at input plug 25 to receptacle 28 to activate and power the video-audio tape recorder. At the same time, the rectifier 21, filter capacitors and regulator 24 provide at terminals 55 and 41 DC voltage power for activating and powering the tuners and IF sections of the recording system to enable the generation of the composite video and audio television signals to be recorded by the video-audio tape recorder.

While a particular embodiment of the invention has been shown and described, modifications may be made, and it is intended in the appended claims to cover all such modifications as may fall within the true spirit and scope of the invention.

What is claimed is:

1. In a recording system of the type which records composite video and audio television signals onto a recording medium which includes a tuning and intermediate frequency section for receiving and converting transmitted television signals into composite video and audio signals and a recording device for recording the composite video and audio signals and having an input adapted for connection to an AC power source, the improvement of a power supply for activating the tuning and intermediate frequency section and the recording device to enable recording of the composite video and audio signals at preselected times comprising:

a timer having an input adapted for connection to an AC line voltage source, a switch coupled to said input and selectively operable for closing at a preselected time for providing said AC line voltage, and a receptacle coupled to said switch and adapted for receiving the recording device input for supplying the recording device with activating AC line voltage when said switch is closed;

rectifying means also coupled to said switch for converting said AC line voltage to a pulsating DC voltage; and filtering means coupled to said rectifying means and to the tuning and intermediate frequency sections for providing the tuning and intermediate frequency sections with activating filtered DC voltage when said switch is closed; whereby, when said switch is closed at said preselected time, the tuning and intermediate frequency sections are activated by said filtered DC voltage derived by said rectifying means and said filtering means from said AC line voltage provided by said timer switch to therby produce the composite video and audio signals, and the recording device is activated for recording the composite video and audio signals by said AC line voltage provided by said timer switch at said receptacle.

2. A system in accordance with claim 1 wherein said rectifying means comprises a diode bridge.

3. A system in accordance with claim 1 further comprising a series regulator coupled between said filtering means and said tuning section for providing said tuning section with a regulated DC voltage when said switch is closed.

4. A system in accordance with claim 3 wherein said series regulator includes means for sensing its output current and means for interrupting said regulated DC voltage when its output current exceeds a predetermined limit.

5. A system in accordance with claim 3 further comprising power indicating means coupled to said voltage regulator for indicating when said regulated DC voltage is being provided to said tuning section.

6. A system in accordance with claim 5 wherein said indicating means is a light emitting diode.

7. A system in accordance with claim 1 wherein said timer includes a timer motor coupled to and powered by said AC line voltage for keeping time.

8. A system in accordance with claim 7 wherein said timer further includes a display coupled to said timer motor for displaying the time being kept by said timer motor.

9. In a recording system of the type which records composite video and audio television signals onto a recording medium which includes a tuning section for receiving transmitted television signals, an intermediate frequency section for converting the received television signals into composite video and audio television signals and a recorder for recording the composite video and audio signals and having a power input adapted for connection to an AC power source, the improvement of a power supply for activating and powering the tuning section, intermediate frequency section and the recorder to enable recording of the transmitted television signals at preselected times comprising:

an input adapted for connection to an AC line voltage source;
a timer motor coupled to said input for keeping time and powered by the AC line voltage;
a switch also coupled to said input and associated with said timer motor for being selectively closed responsive to said timer motor at preselected times;
an AC receptacle coupled to said switch for receiving the AC line voltage when said switch is closed and adapted for receiving the recorder power input;
a diode bridge rectifier also coupled to said switch for providing a pulsating DC voltage derived from the AC line voltage when said switch is closed;
filtering means coupled to said diode bridge rectifier for providing a filtered DC voltage;
a first terminal coupled to said filtering means and to the intermediate frequency section for powering the intermediate frequency section with filtered DC voltage when said switch is closed;
a series regulator also coupled to said filtering means for providing a constant filtered DC voltage when said switch is closed; and
a second terminal coupled to said series regulator and to the tuning section for powering the tuning section with a constant filtered DC voltage when said switch is closed; whereby,
when said switch is closed responsive to said timer motor at said preselected times, said second terminal provides the tuning section with a constant filtered DC voltage to thereby cause the tuning section to receive the transmitted television signals, said first terminal provides the intermediate section with a filtered DC voltage to thereby cause the intermediate section to convert the received transmitted television signals into composite video and audio signals, and said receptacle provides the recorder with AC line voltage to cause the recorder to record the composite video and audio signals.

* * * * *